(12) United States Patent
Nookala et al.

(10) Patent No.: US 6,323,867 B1
(45) Date of Patent: Nov. 27, 2001

(54) PARSING GRAPHICS DATA STRUCTURE INTO COMMAND AND DATA QUEUES

(75) Inventors: Narasimha Nookala, Saratoga; Prahlad Venkatapuram, San Jose, both of CA (US)

(73) Assignee: Mediaq Inc., Santa Clara, CA (US)

( * ) Notice: Subject to any disclaimer, the term of this patent is extended or adjusted under 35 U.S.C. 154(b) by 0 days.

(21) Appl. No.: 09/300,084

(22) Filed: Apr. 26, 1999

(51) Int. Cl.$^7$ .................................................. G06F 13/00
(52) U.S. Cl. .............................. 345/522; 345/526; 710/52
(58) Field of Search .......................... 710/5, 52; 345/522, 345/526

(56) References Cited

U.S. PATENT DOCUMENTS

| | | | |
|---|---|---|---|
| 5,321,806 | * | 6/1994 | Meluerth et al. ............... 345/522 |
| 5,327,127 | * | 7/1994 | May et al. ...................... 341/102 |
| 5,539,914 | * | 7/1996 | Fry et al. ........................ 710/7 |
| 5,931,920 | | 8/1999 | Ghaffari et al. ................ 710/5 |
| 6,075,546 | * | 6/2000 | Hussain et al. ................. 345/522 |
| 6,088,701 | * | 7/2000 | Whaley et al. ................. 707/102 |

FOREIGN PATENT DOCUMENTS

| | | |
|---|---|---|
| 0 780 761 A2 | 6/1997 | (EP) . |
| 0 935 189 A2 | 8/1999 | (EP) . |

\* cited by examiner

*Primary Examiner*—Kenneth S. Kim
(74) *Attorney, Agent, or Firm*—Nguyen & Associates

(57) ABSTRACT

An apparatus that allows for high capacity and fast access command queuing without requiring excess host processor overhead clock gating apparatus that is cost efficient and allows power conservation is provided. A command and its associated data to be processed by a graphics engine are formatted as data structures and first stored in system memory. A number of these data structures can be queued in system memory at any given time. Each data structure includes a header that provides information related to the data words in the data structure such as the number of the data words involved, their destination address, and others. Using the header information provided, the command and its associated data are sequentially provided to the graphics engine for processing.

19 Claims, 9 Drawing Sheets

COMMAND PARSER STATE DIAGRAM

DATA MANAGER

DM STATE MACHINE 1

DM STATE MACHINE 2

PARSING GRAPHICS DATA STRUCTURE INTO COMMAND AND DATA QUEUES

FIELD OF THE INVENTION

The invention generally relates to computer systems, and more particularly relates to minimizing delays when accessing queued commands for execution.

BACKGROUND OF THE INVENTION

With the advances of semiconductor and computer technology, computer systems are becoming faster and at the same time smaller in size. Desk-top and even lap-top computer systems now possess processing speeds of main-frame computers that used to fill up a small room. Even hand-held computer systems such as personal digital assistants (PDA), which are becoming more popular, are getting more powerful. As computer systems become more miniaturized and inexpensive, more demands are constantly being required of them as well. One such demand is speed.

To increase the speed of computer systems, a decentralized approach has been implemented in their design. Within each computer system there are many integrated circuits (IC) designed to perform dedicated functions such as a memory controller, a hard disk controller, a graphics/video controller, a communications controller, and other peripheral controllers. These dedicated integrated circuits can simultaneously perform the different functions independently. Such decentralized approach minimizes "bottlenecks" and therefore helps improve the speed of computer systems.

Even so, the tasks performed by these dedicated integrated circuits, such as graphics and video processing, are becoming increasingly more time-consuming and complex. In graphics and video processing, even a simple task may require executing numerous number of steps. As an example, consider the task of moving a 3 dimensional (3D) graphics object from one position to another position on the display screen. In addition to retrieving the attribute data related to the object (e.g., height, width, color, texture, etc.) from memory (e.g., a frame buffer) and computing the distances between the source and destination positions, the graphics controller must also compute the new color and texture values for the object's pixels to accurately reflect the object's shading at the new position. Accordingly, the graphics controller must perform all these steps in response to this "move" command. While the graphics controller carries out these steps, it is busy and therefore can not execute another command. Meanwhile, additional commands may be generated by the computer user, for example, to further manipulate the graphics objects in this frame buffer. Thus, depending on the processing power of the graphics controller, a long queue of commands is likely to result. Conventionally, these commands are stored in a buffer memory that is external to the graphics controller, to await: for their turn to be executed. However, this requires the host. processor to periodically interrupt or poll the graphics controller to determine whether it is ready for the next command. Such interruption and polling requires a lot of the host processor's time which makes it unavailable for other tasks thereby slowing down the computer system as a whole. In addition, the time required to access the stored commands in the external buffer memory is another important disadvantage.

To help speed up this bottleneck, a First-In-First-Out (FIFO) buffer is implemented inside the graphics controller to store new commands generated while the graphics controller is still busy executing the previous command. The implementation of an internal FIFO buffer means that the host processor no longer needs to interrupt or poll the graphics controller thereby reducing the host processor overhead. The fact that the FIFO buffer is embedded (i.e., internal) in the graphics controller further means that the FIFO buffer access time is reduced. However, the size of the internal FIFO buffer is very much restricted because it takes up valuable space on the IC chip which results in less functions being implemented in the IC circuit. Accordingly, the internal command FIFO buffer is restricted to storing only three or four commands at any one time. Given the complexity of the tasks that current computer systems are required to perform (e.g., graphics) and therefore the command queue involved, such command FIFO BUFFER is inadequate at best and would result in the host processor having to wait for the FIFO buffer to become available.

Thus, a need exists for an apparatus, system, and method that allows for high capacity and fast access command queuing without requiring excessive host processor overhead.

SUMMARY OF THE INVENTION

Accordingly, the present invention provides an apparatus, system, and method that allows for high capacity and fast access command queuing without requiring excess host processor overhead.

The present invention meets the above need with an apparatus for queuing commands to be executed by a processor. The apparatus comprises: a first memory, a data manager coupled to the first memory, a command parser coupled to the data manager, a second memory coupled to the data manager, the command parser, and the processor, and a third memory coupled. to the data manager, the command parser, and the processor.

The first memory stores data structures wherein each data structure includes a header and a plurality of data words. The header has information indicating the number of data words in the data structure and information indicating whether the data words to be followed represent a command or data associated with a command. The data manager retrieves a data structure from the first memory. The command parser receives a header associated with the data structure retrieved by the data manager. The command parser then parses information in the header and provides the results of the parsing to the data manager. If data words in the data structure retrieved by the data manager represent a command, the data manager sends these command to the second memory for storage. On the other hand, if data words in the data structure retrieved by the data manager represent data associated with a command, the data manager sends the data to the third memory for storage.

In an alternate embodiment, the header may further include information (e.g., a link field) indicating whether memory locations storing the plurality of data words are contiguous to that of the header. If the information indicates that the memory locations storing the plurality of data words are not contiguous to that of the header, each data structure further comprises a link pointer pointing to a memory location in the first memory where the plurality of data words are stored. Alternatively, the link pointer points to a source data buffer where the plurality of data words are stored. This scheme allows a linked list of command/source buffers to coexist along with a list of source data buffers.

All the features and advantages of the present invention will become apparent from the following detailed description of its preferred embodiment whose description should be taken in conjunction with the accompanying drawings.

DETAILED DESCRIPTION OF THE INVENTION

Figure 1:
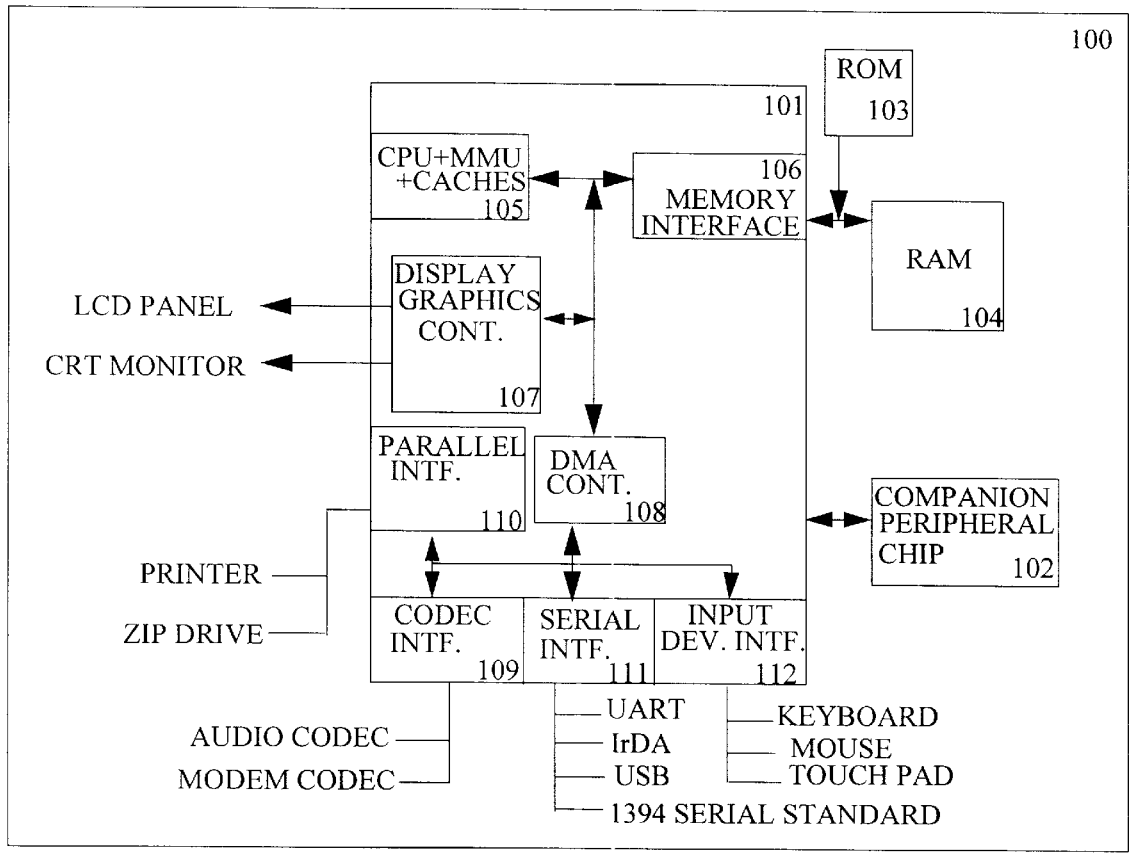
FIG. 1 is a high-level block diagram illustrating a typical computer system that implements the present invention.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in the area involving a graphics/display controller, it is to be appreciated that the present invention is also applicable to any application involving multiple data paths such as communications, core logic, central processing units (CPU), and others.

In accordance to the present invention, a large circular command/source buffer (CSBUF) or a linked list of CSBUFs is implemented as part of system memory (i.e., RAM 104) to store commands to be executed by the graphics engine and the data. associated with these commands. In other words, the system memory is used for storing queued commands and their data. In so doing, quite a few commands and their data can be queued up at any given time. In accordance to the present invention, each command and its associated data can be stored as a data structure in a single buffer or in multiple buffers. The structure header contained in the command buffer includes at least a count field to indicate the number of data words (command or data) involved in the structure and an index field indicating whether command or data is involved. The structure header may further include other indices to help in their retrieval and storage. For example, to allow data structures to be stored in noncontiguous memory locations, a pointer may also be included in the data structure to indicate the system memory location that stores the immediate subsequent data structure. As such, a couple of link indexes may be included in the header to indicate that a link pointer is to be expected at a predetermined location in the data structure (e.g., the next data word of the data structure).

Accordingly, a master mode module is used to first retrieve and examine the structure header. Based on information retrieved from the structure header, the master mode module retrieves the command or data associated with the data structure and stores it in the appropriate registers inside the master mode module. The master mode module then provides the command and its associated data to the graphics engine for processing. In accordance to the present invention, the master mode module is required to continuously monitor the number of commands stored in system memory at any one time. The master mode module is also required to monitor and. determine the memory location in the master mode module to which the next data words can be stored. Depending on the application, the master mode module can be modified to monitor other information, such as link pointers, as well. In so doing, a high capacity fast access command queue arrangements that does not require excessive host CPU overhead is provided.

Reference is now made to FIG. 1 which illustrates, for example, a high-level diagram of computer system 100 upon which the present invention may be implemented or practiced. More particularly, computer system 100 may be a lap-top or hand-held computer system. It is to be appreciated that computer system 100 is exemplary only and that the present invention can operate within a number of different computer systems including desk-top computer systems, general purpose computer systems, embedded computer systems, and others.

As shown in FIG. 1, computer system 100 is a highly integrated system which comprises integrated processor circuit 101, peripheral controller 102, read-only-memory (ROM) 103, and random access memory (RAM) 104. The highly integrated architecture allows power to be conserved. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, input device interface 112, and flat panel interface (FPI) 113. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as ZIP drives, printers, etc. to connect to integrated processor circuit 101. Serial interface 111. provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 vial memory interface 106 and provides the data to peripheral devices connected to CODEC interface 109, parallel interface 110, serial interface 111, or input device interface 112. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
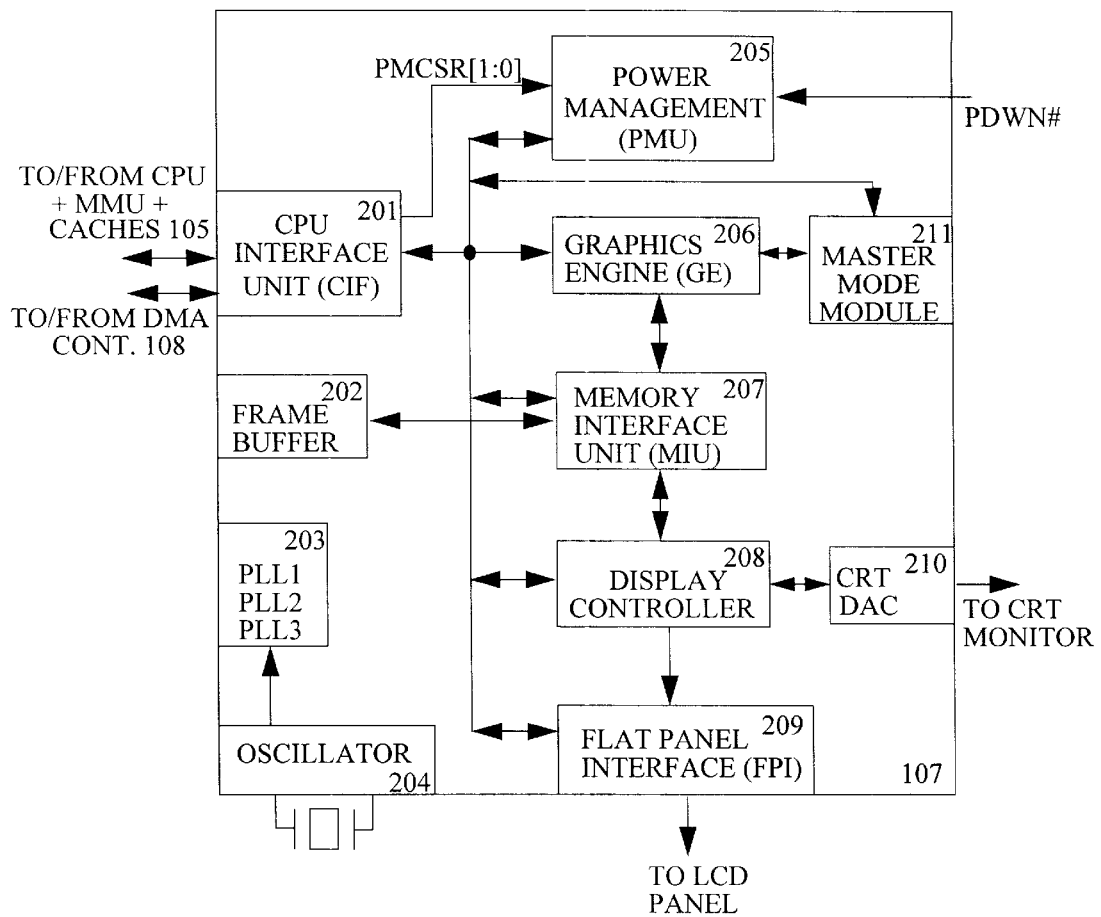
FIG. 2 is a block diagram illustrating in greater detail graphics/display controller 107 illustrated in FIG. 1.

In the preferred embodiment, the invention is implemented as part of graphics/display controller 107. To be more precise, the invention is implemented inside master mode module 211 which is a component of graphics/display controller 107. Reference is now made to FIG. 2 illustrating graphics/display controller 107 in greater detail. In general, graphics/display controller 107 comprises CPU Interface Unit (CIF) 201, frame buffer, 202, Phase Lock Loop (PLL) circuit 203, oscillator 204, Power Management Unit (PMU) 205, Graphics Engine (GE) 206, Memory Interface Unit (MIU) 207, display controller 208, Flat Panel Interface (FPI) 209, CRT Digital-to-Analog Converter (DAC) 210, and master mode module 211. CIF 201 provides the interface to processing unit 105 and DMA controller 108. Accordingly, CIF 201 routes requests and data received from processing unit 105 to the desired destination. In particular, CIF 201 sends register read/write requests received and memory read/write requests from the host CPU processing unit 105 and DMA controller 108 to the appropriate modules in graphics/display controller 107. For example, memory read/write requests are passed on to MIU 207 which in turn reads/writes the data from/to frame buffer 202. CIF 201 also serves as the liaison to the DMA controller 108 to fetch data from system memory (ROM 103 and RAM 104) and provides the data to GE 206 and MIU 207. Further, CIF 201 has a power mode register PMCSR that is programmed by the host CPU in processing unit 105 to control the power state of graphics/display controller 107.

Frame buffer 202 is used to store the display image as well as a temporary buffer for various purposes. Oscillator 204 provides a reference clock signal to PLL circuit 203 which in turn generates three programmable phase lock loop clock signals: PLL1, PLL2, and PLL3 for the different modules in graphics/display controller 107. More particularly, while clock signal PLL1 is used for GE 206 and MIU 207, clock signals PLL2 and PLL3 are used for GE 206, display controller 208, and FPI 209. PMU 205 monitors PMCSR register in CIF 201 together with external signal PDWN# to determine the desired power state. In turn, PMU 205 enables or disables the different modules as well as performs the required power-on and power-off sequence of the different modules as pertaining to a particular power state. GE 206 processes graphics image data stored in frame buffer 202 based on commands issued by the host CPU. Under the present invention, master mode module 211 allows GE 206 to have fast access to queued commands issued by the host CPU.

MIU 207 controls all read and write transactions from/to frame buffer 202. Such read and write requests may come from the host CPU, GE 206, display controller 208, FPI 209 etc. Display controller 208 retrieves image data from frame buffer 202 via MIU 207 and serializes the image data into pixels before outputting them to FPI 209 and CRT DAC 210. Accordingly, display controller 208 generates the required horizontal and vertical display timing signals. If the display device involved is an LCD, pixel data from display controller 208 is sent to FPI 209 before being passed on to the LCD. FPI 209 further processes the data by adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from display controller 208 to analog Red Green and Blue (RGB) signals to be displayed on the CRT monitor.

Figure 3A:
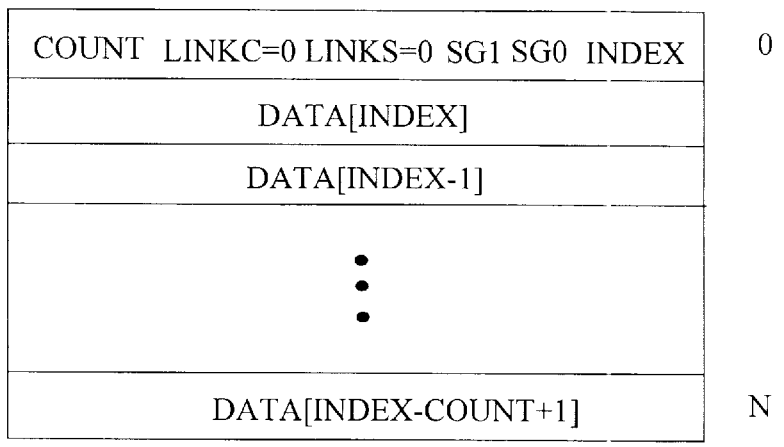
FIG. 3A is an illustration of a data structure in accordance to the present invention wherein the data structure consists of a header followed immediately (i.e., contiguously) by a number of data words.

Referring now to FIGS. 3A–3D illustrating the different embodiments of the data structure in accordance to the present invention. FIG. 3A illustrates a data structure in accordance to the present invention wherein the data structure consists of a header followed immediately (i.e., contiguously) by a number of data words. In the preferred embodiment, each header and each data word is 32 bits long. The data words in each data structure represent either a command or data associated with a command. A command and its associated data can be stored in one contiguous data structure. It is to be appreciated that a command may involve multiple data words (e.g., 3 data words). It is to be appreciated that data associated with a command may be as few as 1 word and as much as 1 Mbyte. As shown in FIG. 3A, each header (having 32 bits) comprises at least a COUNT field and an INDEX field. The COUNT field indicates the number of data words that are to follow the structure header in a data structure. The INDEX field indicates whether the data structure involves command or data. In the preferred embodiment, the INDEX field provides the index of the destination FIFO inside master mode module 211 where the data words are to be stored. Because commands and data are to be stored in separate FIFO buffers (e.g., command FIFO BUFFER and source FIFO BUFFER), by examining the destination index field, it can be determined whether a command or data is involved. Since First-In-First-Out (FIFO) buffers are used to store the data structures' data words in the preferred embodiment, the first data word in a data structure is the first data in and the last data word in a data structure is the last data in.

Each header may further include a LINK field which indicates whether the data words of a data structure are stored. in locations in system memory that are contiguous to that of the header, or in locations in system memory that are non-contiguous to that of the header, or in a different source data, buffer, or in a combination of different locations (e.g., in non-contiguous locations as well as in different source data buffers). As such, added flexibility is provided for command queuing because the data structures can be stored in contiguous locations in the CSBUF, in non-contiguous locations in the CSBUF, or in a different source data buffer. In one embodiment, the source data buffer may be part of the system memory. In the preferred embodiment, the LINK field is a 2-bit field (of bits LINKC and LINKS) wherein the value "00" indicates that the data words in the data structure under consideration are to follow the header immediately (i.e., contiguously) in the CSBUF, the value "10" indicates that the data words in the data structure are stored in a non-contiguous location in the CSBUF, the value "01" indicates that the data words in the data structure are stored in a separate source data buffer, and the value "11" indicates that the data words are stored in a combination of contiguous and non-contiguous locations in the CSBUF and in distributed source data buffer(s).

In the event that the data words of the data structure under consideration are stored in a non-contiguous location, a next CSBUF pointer is provided to point to the memory location where the next set of data words are stored. Such next CSBUFP pointer may be located at a predetermined location in the data structure. For example, in the preferred embodiment, the CSBUF pointer is in the memory location immediately following the header. In so doing, master mode module 211 can locate the next data structure in system memory. Similarly, in the event that the data words of the data structure under consideration are stored in a separate source data buffer in system memory, a source data pointer is provided to point to the source data buffer. Such source data pointer may be located at a predetermined location in the data structure. For example, in the preferred embodiment, the data pointer is in the memory location immediately following the header. Moreover, each header may also include a SG0 and a SG1 field which are used to indicate the GE registers that are to be skipped.

Figure 3B:
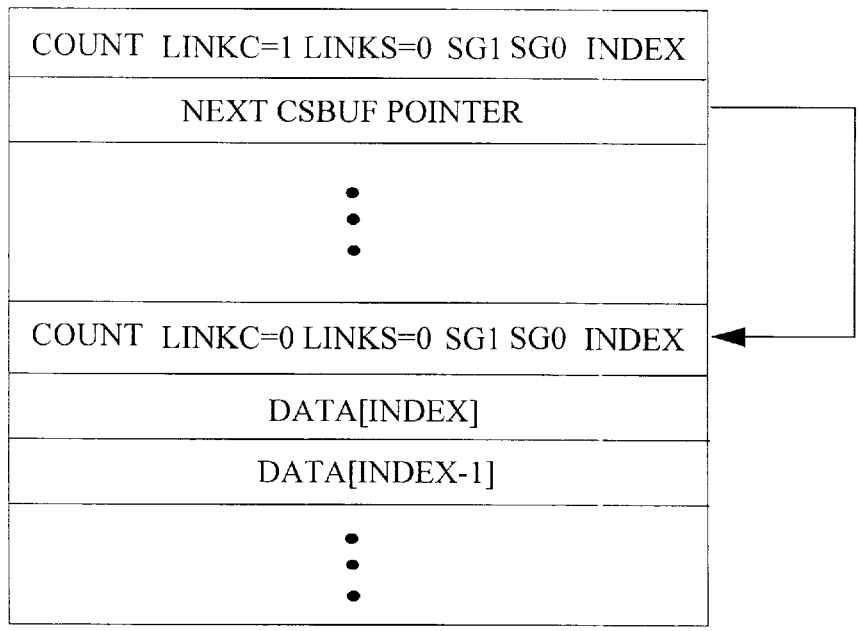
FIG. 3B is an illustration of a data structure in accordance to the present invention wherein the data structure consists of a header followed by a next CSBUF pointer.
Figure 3C:
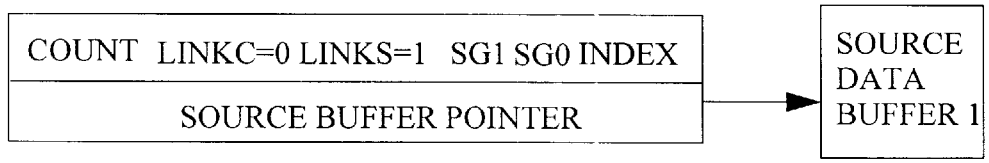
FIG. 3C is an illustration of a data structure in accordance to the present invention wherein the data structure consists of a header followed by a source data pointer.
Figure 3D:
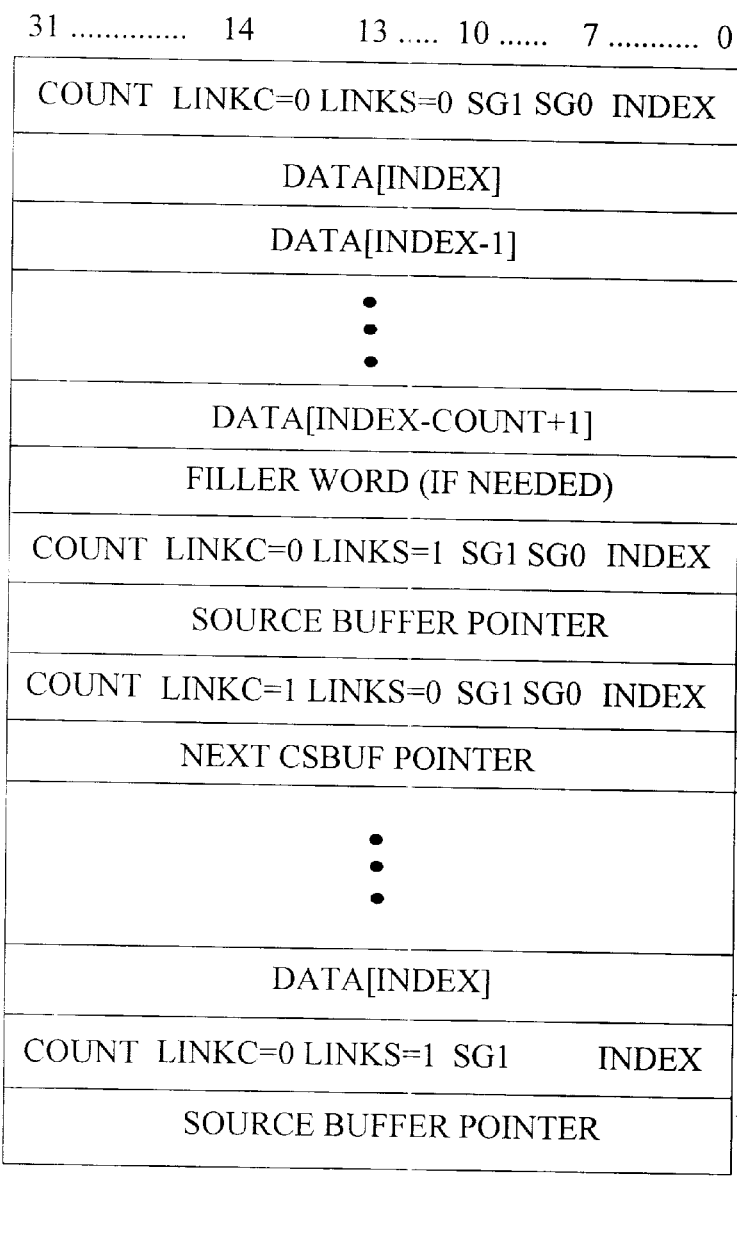
FIG. 3D is an illustration of a general data structure in accordance to the present invention that is stored in both contiguous and non-contiguous CSBUF locations and in distributed source data buffers.

FIG. 3B illustrates a data structure in accordance to the present invention that consists of a header followed by a next CSBUF pointer. As shown, the next CSBUF pointer provides a link to a non-contiguous location in the CSBUF where the data words associated with the header of the data structure under consideration are stored. It is to be appreciated that a header associated with these data words is also provided at this location. FIG. 3C illustrates a data structure in accordance to the present invention that consists of a header followed by a source data pointer. As shown, the source data pointer provides a link to the source data buffer where the data words associated with the header of the data structure under consideration are stored. FIG. 3D illustrates a data structure in accordance to the present invention that is stored in both contiguous and non-contiguous CSBUF locations and in distributed source data buffers (i.e., a combination of the data structures in FIGS. 3A–3C). More particularly, the data structure shown in FIG. 3D may include data words in contiguous locations like in FIG. 3A, a next CSBUF pointer pointing to a non-contiguous location in the CSBUF where a source data pointer like the one illustrated in FIG. 3B is stored, as well as a next CSBUF pointer pointing to another non-contiguous location in the CSBUF where another next CSBUF pointer pointing to a separate source data buffer is stored like in FIG. 3C. In so doing added flexibility is provided for command queuing since a linked list of CSBUF buffers in combination with source data buffers is allowed.

Accordingly, in accordance with the present invention, when the host CPU from processing unit 105 generates a command to be executed by GE 206, the host CPU needs to format the command and its associated data into corresponding data structures that are discussed above. Such formatting can be carried out, for example, by executing a series of implemented steps that are stored in ROM 103. Such implemented steps should be clear to a person of ordinary skill in the art. To generate the header information for each data structure, the host CPU therefore, needs to monitor the number data words in each data structure to generate the COUNT field in the data structure header. The host CPU also needs to determine if the following items are commands or data to generate the appropriate INDEX field in the data structure header. The host CPU further needs to determine whether the data structures are stored in contiguous locations in system memory to assert the LINK field in the data structure header. In addition, the host CPU may have to monitor other variables as needed to generate additional fields in the header such as SG0 and SG1.

Furthermore, the master mode module is required to monitor the number of data structures that are currently stored in the system memory at any given time. For reference purposes, such count is hereinafter referred to as CCOUNT. The data structure count CCOUNT helps in determining whether master mode module 211 should be activated to provide commands and/or data. associated with the commands to GE 206 for processing. To avoid overflow and therefore loss of data, the host CPU is further required to monitor the total number of data words that. all the data structures are currently taken up in system memory. The total number of data words take up by the data structures in system memory is hereinafter referred to as BCOUNT. By comparing the BCOUNT and the amount of system memory allocated for master mode operations (designated as CSBUFSIZE) against each other, an overflow condition can be detected. This information is provided to the components of master mode module 211.

Figure 4:
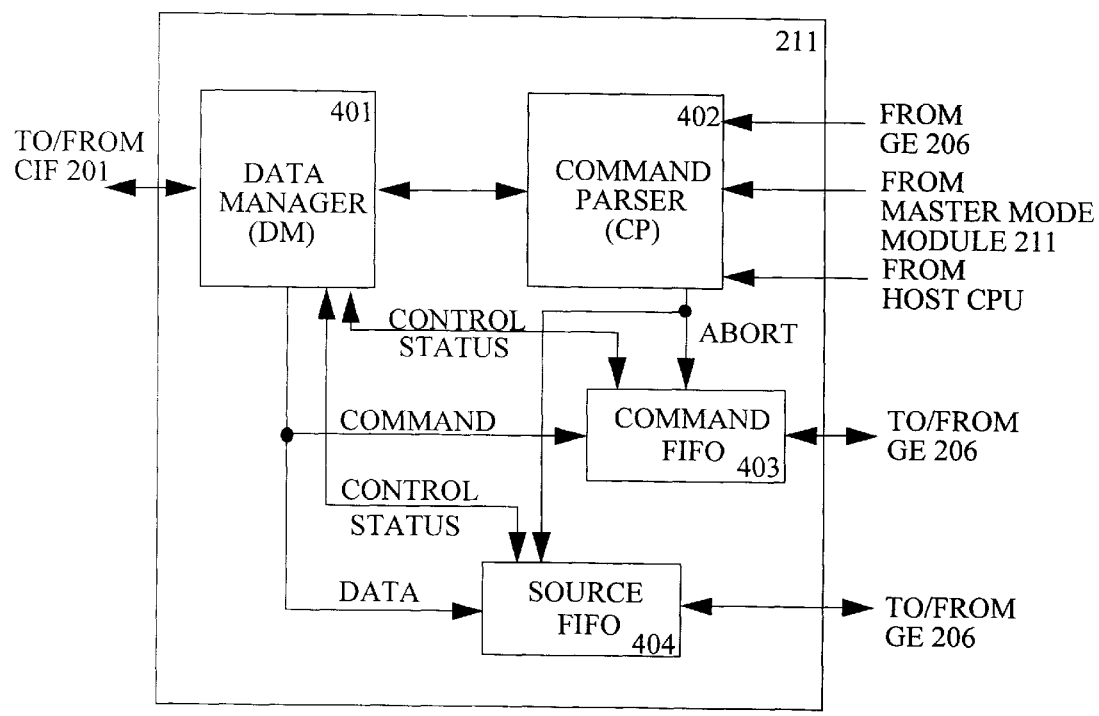
FIG. 4 is a block diagram illustrating in greater detail master mode module 211 illustrated in FIG. 2.

Reference is now made to FIG. 4 illustrating in greater detail master mode module 211 which implements the present invention. As shown in FIG. 4, master mode module 211 includes data manager (DM) 401, command parser (CP) 402, command FIFO buffer 403, and source FIFO buffer 404. In general, DM 401 fetches a data structure, which is described in FIG. 3, from the CSBUF in RAM 104 via CIF 201. As discussed earlier, the CSBUF is preferably implemented as part of system memory. In the current embodiment, the capacity of the CSBUF (a.k.a. CSBUFSIZE) may range between 4 k×32 bits to 512 k×32 bits. DM 301 then passes the header information to CP 402 which parses and. interprets the header information to determine information related to the data structure such as the number of data words involved, the data structure type (i.e., whether command or data is involved), whether the LINK field is enabled, etc. CP 402 then provides the interpreted information and generates the LDCMD signal to DM 401. Based on the interpreted information, DM 401 loads the data words from the: data structure into either command FIFO buffer 403 or source FIFO buffer 404. Such loading is performed upon the activatior. of LDCMD signal.

In the preferred embodiment, command FIFO buffer 403 and source FIFO buffer 404 are both 40-bits wide and 16 bits deep. As such, when commands and data, which are 32 bits wide, are loaded into command FIFO buffer 403, an additional 8 bits are appended to each 32 bits of command or data. The 8 bits added represent the INDEX field from the corresponding structure header. In so doing, when GE 206 subsequently receives the information, it can use the INDEX field (i.e., the destination memory address) to determine whether a command or a data is involved.

As its name suggested, command FIFO buffer 403 is used to store commands to be executed by GE 206. On the other hand, source FIFO buffer 404 is used to store data associated with the commands. In other words, commands and their associated data are stored in separate FIFO buffers. DM 401 also exchanges control/status information with command FIFO buffer 403 and source FIFO buffer 404. For example, DM 401 may generate signals to selectively enable or disable command FIFO buffer 403 or source FIFO buffer 404. Command FIFO buffer 403 and source FIFO buffer 404 may monitor the number of data words currently stored and may make this information available to DM 401. In response to enable signals from GE 206, command FIFO buffer 403 and source FIFO buffer 404 output their contents. Similarly, GE 206 also exchanges control/status information with command FIFO buffer 403 and source FIFO buffer 404. For example, GE 206 may send status signals to determine the number of stored data words inside command FIFO buffer 403 and source FIFO buffer 404. In an emergency scenario, CP 402 may generate an abort signal to halt the operation of command FIFO buffer 403 and source FIFO buffer 404.

Figure 5:
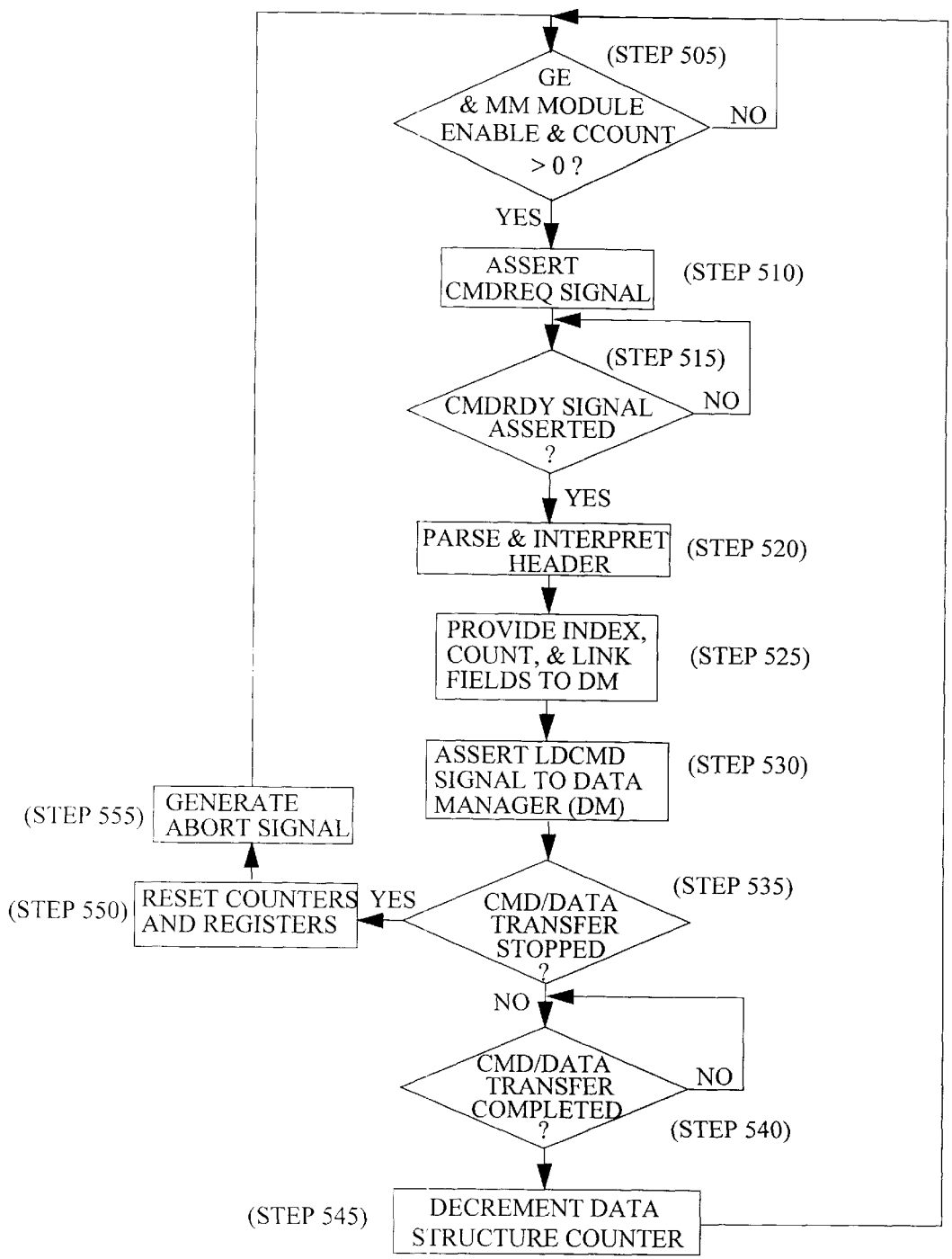
FIG. 5 is a flow chart illustrating the relevant; steps/states performed by command parser 302 in accordance to the present inventions.

FIG. 5 is a flow chart illustrating the relevant steps/states that are performed by CP 402. In the preferred embodiment, the steps/states in FIG. 5 are implemented as part of a state machine. Step 505 represents an IDLE state where CP 402 monitors status signals GEEN, MMEN, and CCOUNT to determine whether GE 206 is active, whether master mode module 211 is enabled, and whether there are data structure currently stored in system memory, respectively. If GE 206 is active, master mode module 211 is enabled, and there is at least one GI command current stored in system memory, CP 402 asserts and sends CMDREQ signal to trigger DM 401 to fetch a data structure from system memory (step 510). Otherwise CP 402 continues monitoring status signals GEEN, MMEN, and CCOUNT. CP 402 then waits for CMDRDY signal to be asserted (step 515). When asserted, CMDRDY signal indicates that DM 401 has fetched a data structure and has forwarded the data structure header to CP 402. If CMDRDY signal has not been asserted, CP 402 continues to wait in step 510. After CMDRDY signal is asserted, CP 402 parses and interprets the structure header (step 520). This means that the header fields such as COUNT, INDEX, LINK, SG0, and SG1 are separated and provided to DM 401 (step 525). In step 530, CP 402 asserts and sends LDCMD signal to DM 401. When asserted, LDCMD signal indicates to DM 401 that the interpreted information is available to be loaded into its registers.

CP 402 then monitors to determine whether the command/data has been halted for any reason (step 535). If so, CP 402 resets its internal counters and registers (step 550) and generates an abort signal to command FIFO buffer 403 and source FIFO buffer 404. Otherwise, CP 402 waits until DM 401 finishes loading the command(s) or data from the data structure into command FIFO buffer 403 or source FIFO buffer 404, respectively (step 540). Upon completion of the data transfer, CP 401 decrements the data structure count CCOUNT to reflect that there is now one less data structure stored in system memory and goes back to step 505.

Figure 6:
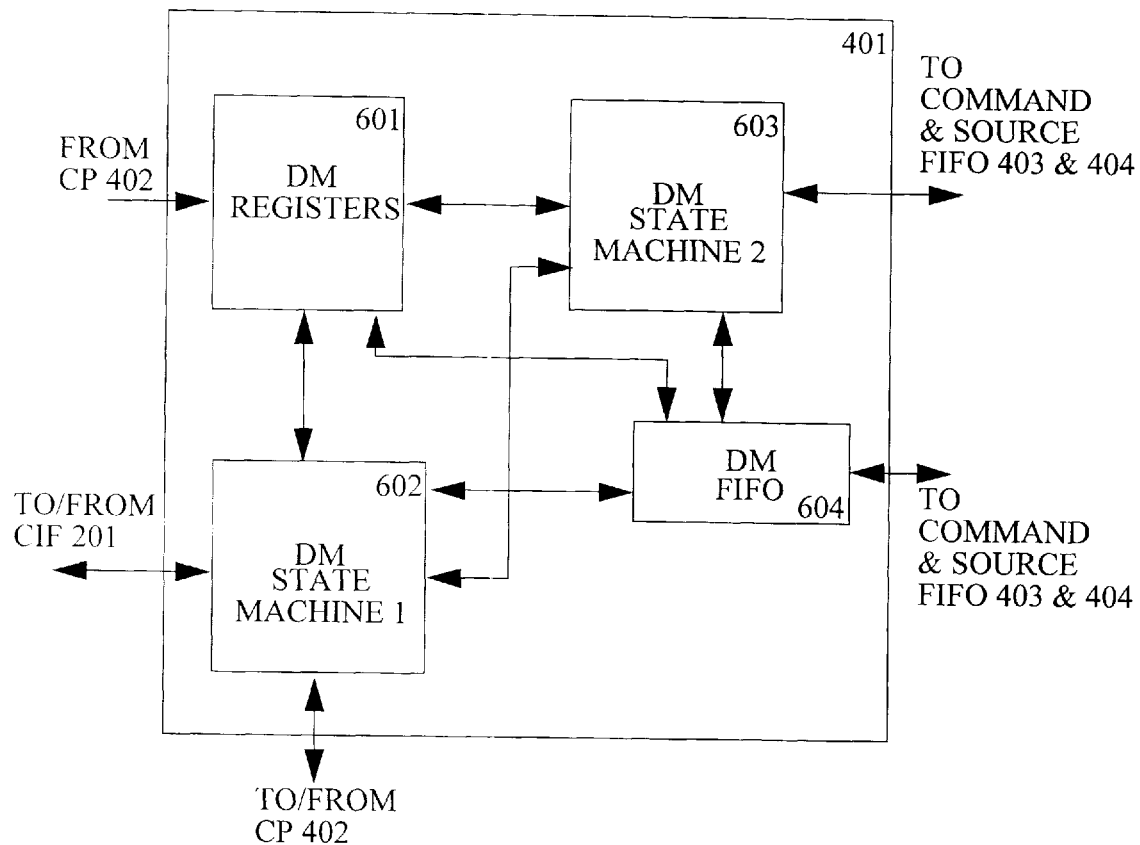
FIG. 6 is a block diagram illustrating in greater detail data manager 301 illustrated in FIG. 3.

Referring now to FIG. 6 illustrating in greater detail DM 401. As shown in FIG. 6, DM 401 includes DM registers 601, DM state machine 602, DM state machine 603, and DM FIFC buffer 604. In general, DM 401 is responsible for fetching the data structures stored in the CSBUF in system memory. In the current embodiment, DMA transfer mode provided by the processor is used in fetching the data structures. However, it is to be appreciated that other data transfer modes can be employed as; well (e.g., PCI bus master mode). When CP 402 asserts CMDREQ signal to request for a data structure stored in the CSBUF, DM state machine 602 responds by fetching the data structure having the command from the CSBUF. DM state machine 602 sends, the header of the data structure to CP 402 and the remainder of the data structure (i.e., the data words) to DM FIFO buffer 604. As discussed earlier, CP 402 separates the information fields of the header and sends them back to DM 401 for storing in DM registers 601. The information fields stored in DM registers 601 are accessed by DM state machines 602 and 603 as needed to update the various counters such as CCOUNT, BCOUNT, and ICOUNT for control purposes as will be discussed below. DM state machine 2 603 is generally responsible for transferring information stored in DM FIFO 604 to either command FIFO buffer 403 or source FIFO buffer 404 depending on whether the information involves a command(s) or data associated with a command, respectively.

Figure 7:
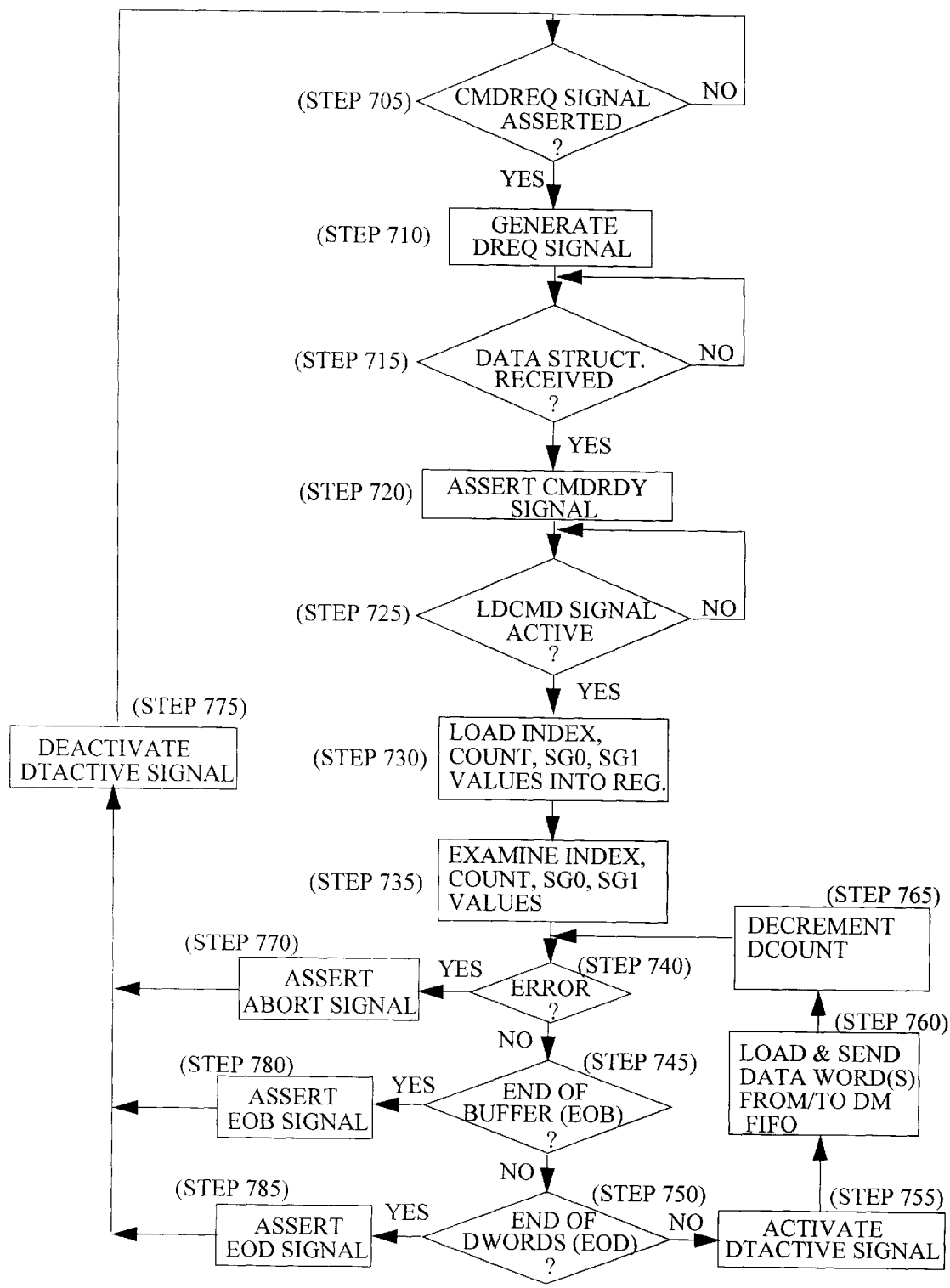
FIG. 7 is a flow chart illustrating the relevant steps/states performed by DM state machine 1 (602) illustrated in FIG. 6.

FIG. 7 is a flow chart illustrating the relevant steps/states in DM state machine 602. In step 705, DM state machine 602 monitors to determine whether the CMDREQ signal from CP 402 has been asserted. As discussed earlier, when the CMDREQ signal is asserted, it indicates that CP 402 has generated a request to DM 401 to retrieve a data structure from the CSBUF in system memory. If the CMDREQ signal is not asserted, DM state machine 602 continues to monitor the CMDREQ signal and stay in step 705. Otherwise, DM state machine 602 generates a DREQ signal to DMA controller 108 to start fetching the data structure from the CSBUF (step 710). As discussed earlier, DMA transfer mode is used in fetching the data structure in the present embodiment. Then DM state machine 602 waits for the data structure to arrive (step 715). When the data structure arrives, DM state machine 602 forwards the header portion of the data structure to CP 402 and asserts CMDRDY signal to so indicate (step 720). DM state machine 602 then monitors LDCMD signal to determine if the command has been parsed by command parser 402 (active) (step 725). As discussed earlier, when asserted, LDCMD signal indicates that the parse header fields are available to be loaded into DM registers 601. In addition, when LDCMD signal is asserted, DM state machine 602 sets the data word count DCOUNT to the value (COUNT※1) and the index count ICOUNT to the value of the INDEX field. The data word count DCOUNT is used to determine the number of data words to fetch from CSBUF and also whether all the data words in a data structure have been fetched. The index count ICOUNT points to either command FIFO 403 or source FIFO 404. In the case of command FIFO 403, ICOUNT gets decremented by 1 after every data transfer. In the case of source FIFO 404, ICOUNT does not change.

Accordingly, when LDCMD signal is asserted, the header fields are loaded into predetermined DM registers 601 (step 730). In step 735, DM state machine 602 examines the header fields to determine if any of the following conditions is occurring: 1) the INDEX field points to any reserved location (step 740), 2) command FIFO buffer 403 or source FIFO buffer 404 are out of storage room (step 745), and 3) there is no more data words from the current data structure (step 750).

If the INDEX field points to a reserved location, this is an error condition because it means that data words in a data structure are supposed to be sent to a reserved memory location (step 740). In this case, DM state machine 602 asserts the abort signal (step 770). DM state machine 602 then deactivates DTACTIVE signal which is used to signal to DM state machine 603 to halt its data transfer operation (step 775). As discussed. earlier, the count ICOUNT represents the available storage room for command FIFO buffer 403. When the count ICOUNT reaches zero (0), it indicates that there is no more storage room available in command FIFO buffer 403 (step 745). In this case, DM state machine 602 asserts the End-of-Buffer (EOB) signal (step 780) and deactivate DTACTIVE signal (step 775). As discussed earlier, the count DCOUNT represents the number of data words in the data structure at hand. When the count. DCOUNT reaches zero (0), it indicates that there are no more data words in the present data structure to be fetched.

In this case, DM state machine 602 asserts the End-of-Command (EOC) signal (step 750) and deactivate DTACTIVE signal (step 785). After step 785, DM state machine 602 goes back to step 705.

If there is no error condition, there is still storage room available, and there are still data words to be fetched, DM state machine 602 asserts the DTACTIVE signal to indicate to DM state machine 603 that it should start transferring data words in DM FIFO 604 to either command FIFO buffer 403 or source FIFO buffer 404 depending on the destination location which is indicated by the header field INDEX (step 755). Next, DM state machine 602 carries out the task of loading DM FIFO buffer 604 with a 'new' data word from the data structure and sending the 'old' data word that has been stored in DM FIFO buffer 604 to either command FIFO buffer 403 or source FIFO buffer 404 (step 760). When a data word is fetched from the CSBUF in system memory to DM FIFO buffer 604, DM state machine 602 decrements the count DCOUNT. Moreover, each time a data word is fetched from the CSBUF to DM FIFO buffer 604, DM state machine 602 decrements the count BCOUNT which represents the total number of data words take up by the data structures in system memory.

Figure 8:
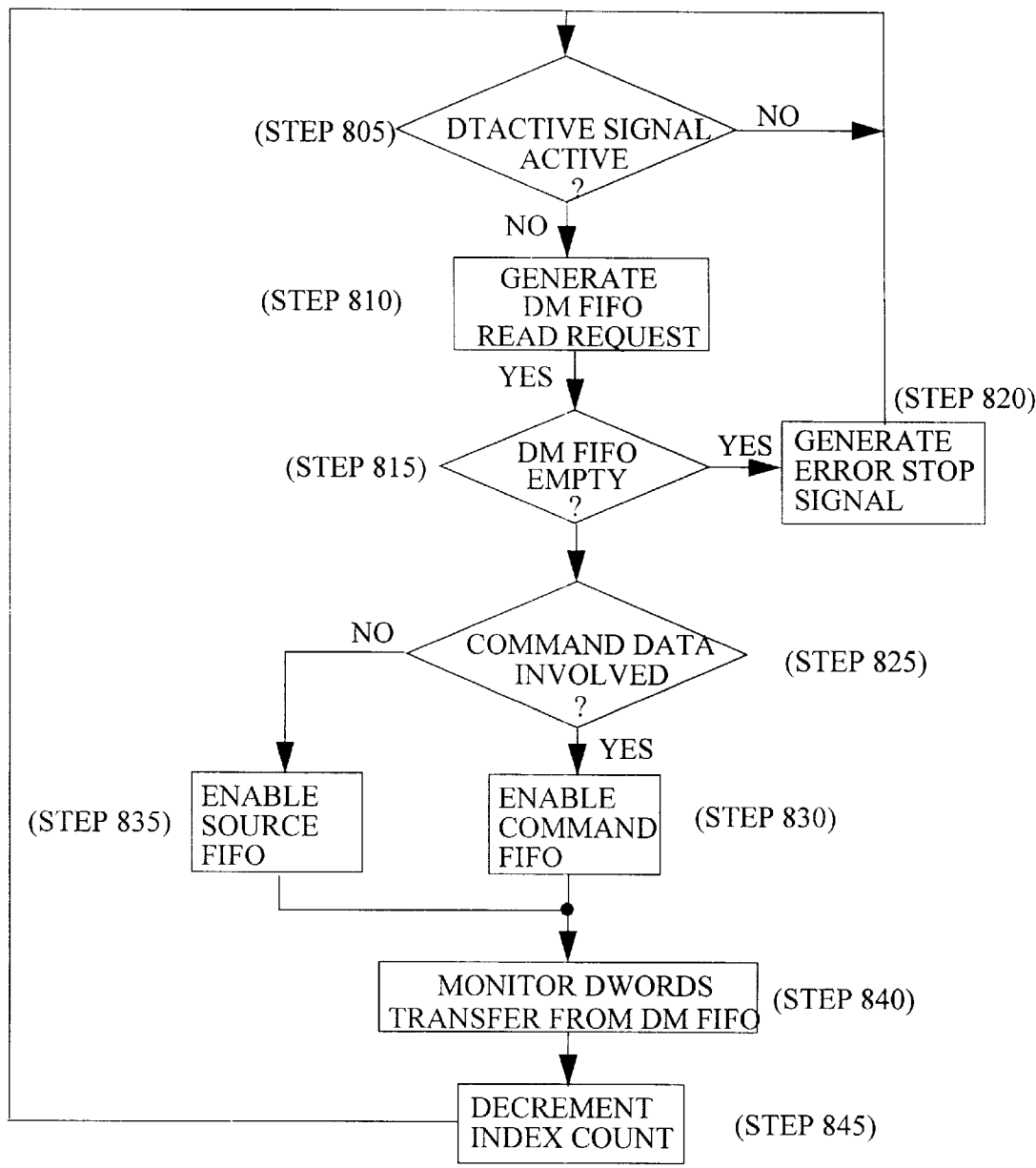
FIG. 8 is a flow chart illustrating the relevant steps/states performed by DM state machine 2 (603) illustrated in FIG. 6.

FIG. 8 is a flow chart illustrating the relevant steps/states in DM state machine 603. In step 805, DM state machine 603 monitors DTACTIVE signal to determine whether it is asserted. If DTACTIVE signal is not asserted, DM state machine continues its monitoring. Otherwise, DM state machine 603 generates a read request to DM FIFO buffer 604 (step 810). Next, DM state machine 603 determines whether DM FIFO buffer 604 is empty (step 815). If DM FIFO buffer 604 indicates that. it is empty, DM state machine 603 generates an error signal to stop the data transfer (step 820). If DM FIFO buffer 604 is not empty, DM state machine 603 next determines (from the INDEX field) whether a command or data is involved (step 825). If a command is involved, DM state machine 603 sends an enable signal to command FIFO buffer 403 (step 830). On the other hand, if data is involved, DM state machine 603 sends an enable signal to source FIFO buffer 404 (step 835). Whether command FIFO buffer 403 or source FIFO buffer 404 is enabled, the next step of DM state machine 603 involves monitoring to ensure that data words are transferred from DM FIFO buffer 604 to the appropriate FIFO buffer (command FIFO buffer 403 or source FIFO buffer 404) (step 840). DM state machine 603 then decrements the count ICOUNT if the data transfer is to command FIFO 403 (step 845).

An embodiment of the present invention, a system, apparatus, and method that allows for high capacity and fast access command queuing without requiring excess host processor overhead is thus described. While the present invention has been described in particular embodiments, the present invention should not be construed as limited by such embodiments, but rather construed according to the below claims.

What is claimed is:

1. An apparatus for queuing commands to be executed by a processor comprising:

first memory for storing data structures wherein each data structure comprising a header and at least one data word, the header comprising information indicating the number of data words in the data structure and information indicating whether the data words to be followed represent a command or data to be used with a command;

a data manager coupled to the first memory, the data manager retrieving a data structure from the first memory;

a command parser coupled to the data manager, the command parser receiving a header associated with the data structure retrieved by the data manager, the command parser parsing information in the header and providing parsed information to the data manager;

second memory coupled to the data manager, the command parser, and the processor, if data words in the data structure retrieved by the data manager represent a command, the data manager sending the command to the second memory for queuing; and third memory coupled to the data manager, the command parser, and the processor, if data words in the data structure retrieved by the data manager represent data to be used with a command, the data manager sending the data to the third memory for queuing.

2. The apparatus of claim 1, wherein the header further comprising information indicating whether the at least one data word is stored in memory locations contiguous to the header.

3. The apparatus of claim 2, wherein if the information indicates that the at least one data word is not stored in memory locations contiguous to the header, the at least one data word comprising a link pointer pointing to a memory location in the first memory where the at least one data word is stored.

4. The apparatus of claim 2, wherein if the information indicates that the at least one data word is not stored in memory locations contiguous to the header, the at least one data word comprising a link pointer pointing to a source data buffer where the at least one data word is stored.

5. The apparatus of claim 3, wherein the data manager comprising:

a FIFO buffer;

a plurality of registers coupled to the FIFO buffer, the plurality of registers storing parsed header information received from the command parser;

a first state machine coupled to the FIFO buffer and the plurality of registers, using parsed header information in the plurality of registers, the first state machine fetching data words in the data structure from the first memory for storing in the FIFO buffer; and a second state machine coupled to the first state machine, the plurality of registers, and the FIFO buffer, the second. state machine transferring the data words to the processor in response to a control signal from the first state machine.

6. The apparatus of claim 5, wherein the first memory is external of the apparatus.

7. The apparatus of claim 6, wherein the second memory and the third memory are FIFO buffers.

8. A computer system comprising:

a central processing unit (CPU);

system memory coupled to the CPU, the system memory storing data structures wherein each data structure comprising a header and at least one data word, the header comprising information indicating the number of data words in the data structure and information indicating whether the data words to be followed represent a command or data to be used with a command;

a graphics controller coupled to the CPU and the system memory, the graphics controller comprising:

a graphics engine; and a master mode module coupled to the graphics engine, the master mode module comprising:

a data manager coupled to the system memory, the data manager retrieving a data structure from the system memory;

a command parser coupled to the data manager, the command parser receiving a header associated with the data structure retrieved by the data manager, the command parser parsing information in the header and providing parsed information to the data manager;

first memory coupled to the data manager, the command parser, and the processor, if data words in the data structure retrieved by the data manager represent a command, the data manager sending the command to the first memory for queuing; and second memory coupled to the data manager, the command parser, and the processor, if data words in the data structure retrieved by the data manager represent data to be used with a command, the data manager sending the data to the second memory for queuing;

wherein the graphics engine retrieving the command and data to be used by a command for processing from the first and second memory.

9. The computer system of claim 8, wherein the header further comprising information indicating whether the at least one data word is stored in memory locations contiguous to the header.

10. The computer system of claim 9, wherein if the information indicates that the at least one data word is not stored in memory locations contiguous to the header, the at least one data word comprising a link pointer pointing to a memory location in the first memory where the at least one data word is stored.

11. The computer system of claim 9, wherein if the information indicates that the at least one data word is not stored in memory locations contiguous to the header, the at least one data word comprising a link pointer pointing to a source data buffer where the at least one data word is stored.

12. The computer system of claim 10, wherein the data manager comprising:

a FIFO buffer;

a plurality of registers coupled to the FIFO buffer, the plurality of registers storing parsed header information received from the command parser;

a first state machine coupled to the FIFO buffer and the plurality of registers, using parsed header information in the plurality of registers, the first state machine fetching data words in the data structure from the system memory for storing: in the FIFO buffer; and a second state machine coupled to the first state machine, the plurality of registers, and the FIFO buffer, the second state machine transferring the data words to the graphics; engine in response to a control signal from the first state machine.

13. The computer system of claim 12, wherein the first memory and the second memory are FIFO buffers.

14. A method to queue commands and associated data for processing comprising:

storing data structures in a first memory wherein each data structure comprising a header followed by at least one data word, the header comprising information indicating the number of data words in the data structure and information indicating whether the data words to be followed represent a command or data to be used with a command;

fetching a data structure;

parsing and separating information in the header of the data structure;

determining from the header information whether data words in the data structure represent a command or data to be used with a command;

if data words in the data structure represent a command, sending the command to a second memory for queuing; and if data words in the data structure represent data to be used with a command, sending the data to a third memory for queuing.

15. The method of claim 14, wherein the header further comprising information indicating whether the at least one data word is stored in memory locations contiguous to the header.

16. The method of claim 15, wherein if the information indicates that the at least one data word is not stored in memory locations contiguous to the header, the at least one data word comprising a link pointer pointing to a memory location in the first memory where the at least one data word is stored.

17. The method of claim 15, wherein if the information indicates that the at least one data word is not stored in memory locations contiguous to the header, the at least one data word comprising a link pointer pointing to a source data buffer where the at least one data word is stored.

18. The method of claim 16, wherein the first memory is a system memory.

19. The method of claim 18 further comprising the step of providing the command stored in the second memory and data to be used with the command stored in the third memory to a processor for processing.

* * * * *